July 8, 1958  E. A. HELMKE  2,841,968
CONSTANT VELOCITY UNIVERSAL JOINT
Filed May 31, 1956
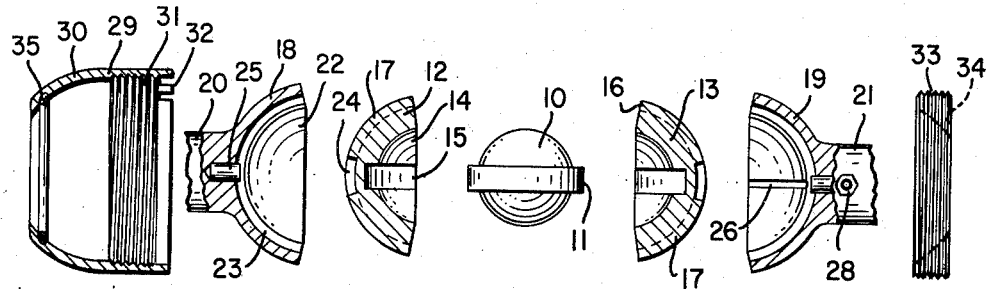
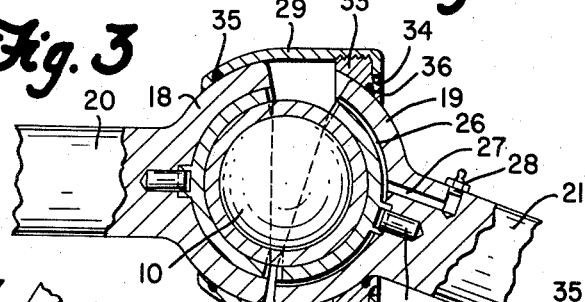
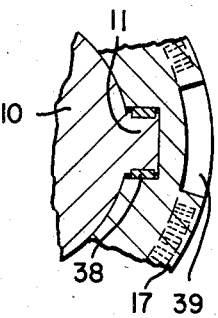
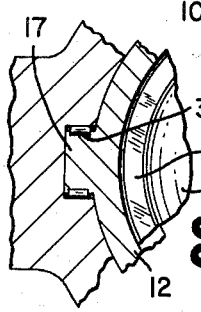
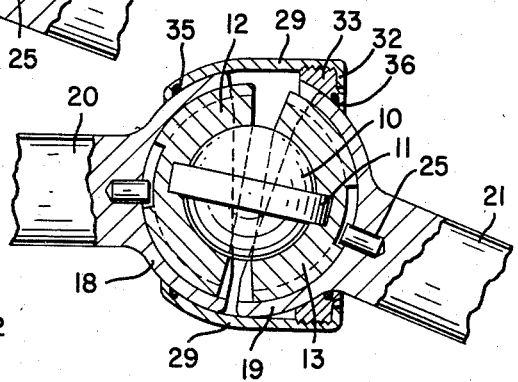
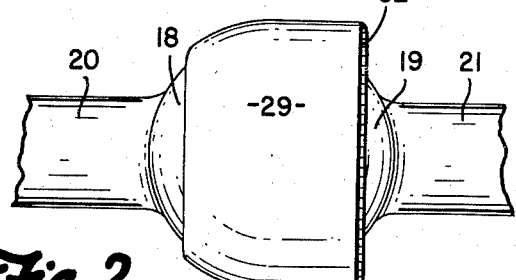
INVENTOR.
EMIL A. HELMKE
BY
ATTORNEY

United States Patent Office 2,841,968
Patented July 8, 1958

2,841,968
CONSTANT VELOCITY UNIVERSAL JOINT

Emil A. Helmke, East Detroit, Mich.

Application May 31, 1956, Serial No. 588,432

6 Claims. (Cl. 64—21)

This invention relates to constant angular velocity universal joints and objects of the invention are to produce a joint of this character which can be economically manufactured and assembled on a large quantity production basis; which has a minimum of parts and is relatively easy to assemble during the manufacturing process; which embodies parts which can be manufactured without difficulty; which embodies a freely movable part for transmitting torque and for all practical purposes will not bind and can be readily lubricated; and which has the new and improved features of construction, arrangement and operation hereinafter described.

For purposes of illustration but not of limitation, an embodiment of the invention is shown on the accompanying drawings in which:

Figure 1 is an exploded view shown in vertical sectional elevation and in elevation of the various parts which make up the joint;

Figure 2 is a side elevation of the assembled joint, the shaft members being shown in fragment;

Figure 3 is a longitudinal sectional elevation of the assembled joint with the shaft members angularly disposed to each other;

Figure 4 is a longitudinal sectional view of the joint similar to but taken through a different plane than that of Figure 3;

Figure 5 is an enlarged fragmentary view showing the anti-friction bearing disposed between an outer shell member and the juxtaposed coacting member; and Figure 6 is an enlarged fragmentary sectional view showing anti-friction bearing members for the central spherical element and associated with the intermediate coacting member.

The illustrated embodiment of the invention comprises a constant velocity universal joint which embodies a solid metallic ball or sphere 10 which is disposed at the center of the joint. Rigid with and preferably integral with the sphere 10 is an outwardly extending cylindrical flange or key 11 having flat opposite sides and being disposed centrally of the sphere so that equal portions of the sphere are arranged on opposite sides of the key 11. As will hereinafter appear, all driving force transmitted from the driving to the driven parts is transmitted through the sphere 10 by way of the cylindrical key 11.

On each side of the central sphere 10 are substantially semi-spherical shells 12 and 13 which are identical. The inside surface of each of the shells 12 and 13 is semi-circular and intimately fits the juxatposed surface of the sphere 10 and has a nice sliding fit thereon. In each of the shells 12 and 13 is a semi-circular key way 15 into which portions of the key 11 slidingly fit. It will be understood that the shells 12 and 13 are dimensioned so that when fitted to the central sphere 10 they do not abut each other. On the contrary slight spacing is provided between the facing surfaces of these two shells when the up and down edges thereof are substantially parallel. It will also be observed that the inner edges of the shells 12 and 13 incline rearwardly as indicated at 16. The outer surface of each of the shells 12 and 13 is also substantially semi-spherical and concentric with the inside substantially semi-spherical contour. The thickness of the shells 12 and 13 is so chosen that adequate strength is afforded these parts after the key way 15 has been formed. At exactly 90° to the key way 15 of each of the shells is a key 17 which projects outwardly beyond the dome-like outer surface of each shell.

On the outside of the shells 12 and 13 are main exterior shells 18 and 19 respectively, the shell 18 having a shaft part part 20 which is the driving end of the joint and the shell 19 having a shaft part 21 constituting the driven part of the joint. The exterior shells 18 and 19 are of the same construction except that the shell 19 is provided with lubricating means which will be hereinafter described. As shown, each of the main exterior shells has an inner substantially semi-spherical surface 22 contoured to have a nice sliding fit with the exterior surface 22 contoured to have a nice sliding fit with the exterior surface of the adjacent inner shell. On the inside of each of the shells 18, and 19 is a key way 23 for slidingly receiving the key 17 of the adjacent inner shell so that a sliding fit is obtained between these parts. The key way 23, is bisected by the axis of the shaft part 20. As shown there is a slot 24 disposed centrally of each exterior shell and into the slot extends a rigid pin 25 which limits the rocking movement of the respective main shell relative to the adjacent inner shell 16 or 17.

The outer surface of each of the main shells 18 and 19 is dome shaped, the curvature of which is concentric to that of the sphere 10. Thus the various semi-spherical surfaces on opposite sides of the central sphere 10 are concentric to such sphere.

At the driven end of the joint, in the main exterior shell 19 is a grease groove 26 which extends from one free end to the other and intersecting the groove 26 is a passage 27 which communicates with a grease fitting 28.

The parts of the joint are retained in assembled relation by a housing having a main straight tubular body 29, the inner end of which is curved as indicated at 30 to conform to the curvature of the outer surface of the adjacent main shell 18 and the opposite end portion is provided with a series of screw threads 31 on the inside thereof. Thus the main body 29 has a sliding fit with the main shell 18, and it is of sufficient length to extend over the parts of the joint and of such diameter as to clear same. At the outer end of the body adjacent the screw threads is a series of fingers or tabs 32 which are spaced from each other and extend throughout the circumference of the housing part. In screw-threaded engagement with the thread 31 of the main housing body 29 is an externally threaded ring 33 which has a curved inner surface 34 slidingly fitting the exterior surface of the main shell 19. In the outer end of the ring 31 is an annular row of spaced grooves 34 into which fingers 32 are bent thereby securing the housing parts together and militating against relative turning movement between these parts. It is not necessary that there be sufficient of the grooves 34 to accommodate each of the fingers 32 so that some of the fingers may be bent over the outer end of the ring 33. In the housing part 29 is an annular groove 35 to receive a grease seal and likewise in the inside of the ring 33 is a groove 36 to receive a grease seal.

Figure 5 shows an alternate form in which the key 17 of each of the inner shells is provided with anti-friction thrust bearings 37 on each side and for this purpose manifestly additional clearance must be afforded in the width of the key and the key way receiving the same to admit these bearings.

In Figure 6 the key 11 is shown provided with anti-friction bearings 38 and opposite sides of the key 17, grooves are formed to enable the insulation of anti-friction bearings 39, a portion of the key being left on each end to prevent the bearings from working out of the key way as indicated at 39.

From the above description, it will be manifest that the inner shells 16 and 17 are free to rock in one direction or the other on the sphere 10 as well as relative to the respective main shells 18 and 19. When the joint is operating at an angle, these parts slide freely in both of these directions, maintaining the key-ways 23 in the main shells 18 and 19 in perfect alignment with each other. These internal movements of the joint parts are self compensating in their true round contained position. This constant true alignment of the key ways of the main shells 18 and 19 makes possible the delivery of a constant velocity.

Numerous changes in details of construction, arrangement and choice of materials may be effected without departing from the spirit of the invention, especially as defined in the appended claims.

What I claim is:

1. A universal joint comprising an exterior driving shell, an exterior driven shell, an interior shell for said driving shell, an interior shell for said driven shell, a central free, floating sphere engaged by both interior shells, a continuous cylindrical key integral with and surrounding said central sphere, a key way in each interior shell receiving a portion of said sphere key whereby the driving and driven shells are maintained at an angle of 180°, interfitting keys and key ways connecting said interior shells and the respective driving and driven shells and arranged at 90° relative to said sphere key, the engaging surfaces of said interior and exterior surfaces being curved and concentric with said central sphere, and a housing enclosing said exterior shells for retaining the parts assembled.

2. A universal joint comprising an exterior driving shell, an exterior driven shell, an interior shell for said driving shell, an interior shell for said driven shell, pin and slot means to limit the rocking movement of each interior shell relative its respective exterior shell, a central free, floating sphere engaged by both interior shells, a continuous cylindrical key surrounding said central sphere, a key way in each interior shell receiving a portion of said sphere key whereby the driving and driven shells are maintained at an angle of 180°, interfitting keys and key ways connecting said interior shells and the respective driving and driven shells and arranged at 90° relative to said sphere key, the engaging surfaces of said interior and exterior surfaces being curved and concentric with said central sphere, and a housing having separable parts enclosing and having curved bearing surfaces slidingly engaging said exterior shells respectively for retaining the parts assembled.

3. A universal joint comprising an exterior driving shell, an exterior driven shell, an interior shell for said driving shell, an interior shell for said driven shell, a central sphere engaged by both interior shells, a cylindrical key surrounding said central sphere, a key way in each interior shell receiving a portion of said sphere key, interfitting keys and key ways connecting said interior shells and the respective driving and driven shells and arranged at 90° relative to said sphere key, the engaging surfaces of said interior and exterior surfaces being curved and concentric with said central sphere, a housing part in the form of a straight tubular body having an interiorly curved surface at one end slidingly fitting one of the exterior shells, an interiorly screw threaded portion at the other end of said body, an exteriorly screw threaded ring engaging said interiorly screw threaded portion and having an interiorly curved surface slidingly fitting the other exterior shell, and means for retaining said housing and ring in assembled relation.

4. A universal joint comprising an exterior driving shell, an exterior driven shell, an interior shell for said driving shell, an interior shell for said driven shell, a central sphere engaged by both interior shells, a cylindrical key surrounding said central sphere, a key way in each interior shell receiving a portion of said sphere key, interfitting keys and key ways connecting said interior shells and the respective driving and driven shells and arranged at 90° relative to said sphere key, the engaging surfaces of said interior and exterior surfaces being curved and concentric with said central sphere, a housing part in the form of a straight tubular body having an interiorly curved surface at one end slidingly fitting one of the exterior shells, an interiorly screw threaded portion at the other end of said body, an exteriorly screw threaded ring engaging said interiorly screw threaded portion and having an interiorly curved surface slidingly fitting the other exterior shell, and finger and notch means on said tubular body and ring respectively for holding the housing parts in predetermined assembled relation.

5. A universal joint comprising an exterior driving shell, an exterior driven shell, an interior groove on said exterior driven shell for grease, means for forcing grease to said groove from the outside, an interior shell for said driving shell, an interior shell for said driven shell, a central sphere engaged by both interior shells, a cylindrical key surrounding said central sphere, a key way in each interior shell receiving a portion of said sphere key, interfitting keys and key ways connecting said interior shells and the respective driving and driven shells and arranged at 90° relative to said sphere key, the engaging surfaces of said interior and exterior surfaces being curved and concentric with said central sphere, a housing part in the form of a straight tubular body having an interiorly curved surface at one end slidingly fitting one of the exterior shells, an interiorly screw threaded portion at the other end of said body, an exteriorly screw threaded ring engaging said interiorly screw threaded portion and having an interiorly curved surface slidingly fitting the other exterior shell, grease seals on the outer end of each of said body and ring, and means for retaining said housing and ring in assembled relation.

6. A universal joint as claimed in claim 5 comprising anti-friction bearings on opposite sides of each of the keys.

References Cited in the file of this patent

UNITED STATES PATENTS

| 1,101,996 | Carter et al. | June 30, 1914 |
| 1,145,401 | Bowen | July 6, 1915 |
| 1,522,787 | Meier | Jan. 13, 1925 |
| 1,576,089 | Burns | Mar. 9, 1926 |

FOREIGN PATENTS

| 423,486 | Great Britain | Feb. 1, 1935 |